Figure 1:
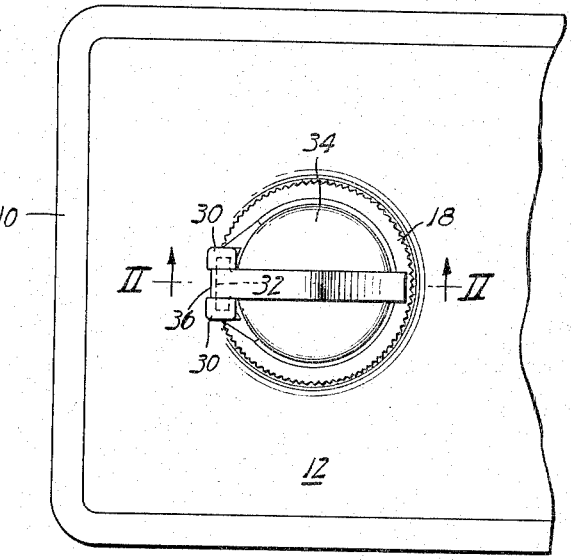
Figure 1:
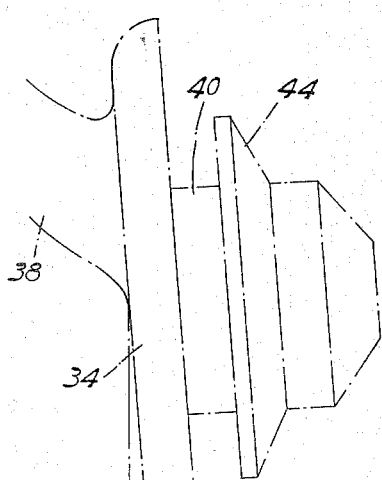

March 23, 1954     H. A. KENNEDY     2,673,231

STORAGE BATTERY CAP

Filed Nov. 17, 1948

INVENTOR
Henry A. Kennedy
BY
Bean, Brooks, Buckley & Bean.
ATTORNEYS

Patented Mar. 23, 1954

2,673,231

UNITED STATES PATENT OFFICE 2,673,231

STORAGE BATTERY CAP

Henry A. Kennedy, Philadelphia, Pa., assignor to National Battery Company, St. Paul, Minn.

Application November 17, 1948, Serial No. 60,578

9 Claims. (Cl. 136—177)

This invention relates to storage batteries, and more specifically to an improved form of filling opening cap for storage battery containers and the like. The invention is especially adapted to storage batteries in mobile use, in motor vehicles, railway equipment, submarines, and the like.

It is of course well known that storage batteries must be periodically serviced by adding water and/or acid to maintain the electrolyte within a permissible level range; and frequently such batteries are carried within cramped compartments in out-of-way places under extremely limited head room conditions, whereby the battery cell filling openings are not readily accessible to the servicing personnel. Nevertheless it is necessary for a serviceman to regularly open each battery cell cap and check the level of the liquid therewithin and to replenishing the liquid supply if necessary as through means of a hose or the like. Thus, the serviceman will oftentimes proceed first to remove the row of caps extending lengthwise of the bank of battery cells, and he will then proceed to fill the cells with water by directing a hose nozzle into the openings. Finally, it is his duty to replace the battery cell caps so as to prevent undue evaporation and/or splashing of the battery liquid out through the filling openings as when the vehicle carrying the battery is in motion; but the servicemen are often careless and negligent in this respect and the filler openings are often left uncovered after such servicing with the result that the battery liquid slops out of the uncovered cells when the vehicle carrying the battery goes into motion, thereby causing many battery failures.

It is one of the objects of the present invention to provide an improved battery opening cap which is readily openable for servicing purposes, and which cannot be accidentally displaced and which will move into its proper cell closing position of its own accord if left standing in open position, as in response to movement of the vehicle or other structure carrying the battery.

Another object of the invention is to provide an improved battery cap device which will close itself automatically subsequent to a battery cell filling operation in event that the serviceman neglects to close it, but stands open to avoid interfering with the battery servicing operation, and then later closes in such manner as to safely guard against the possibility of splashing of the battery liquid out of the opening.

Another object of the invention is to provide an improved battery cap of the character aforesaid which also embodies an improved battery gas venting arrangement, whereby the gas which is generated by normal operation of the battery will at all times find escape.

Another object of the invention is to provide an improved gas vent arrangement which is spray-proof and seepage-proof.

Other objects and advantages of the invention will appear from the specification hereinafter.

Figure 2:
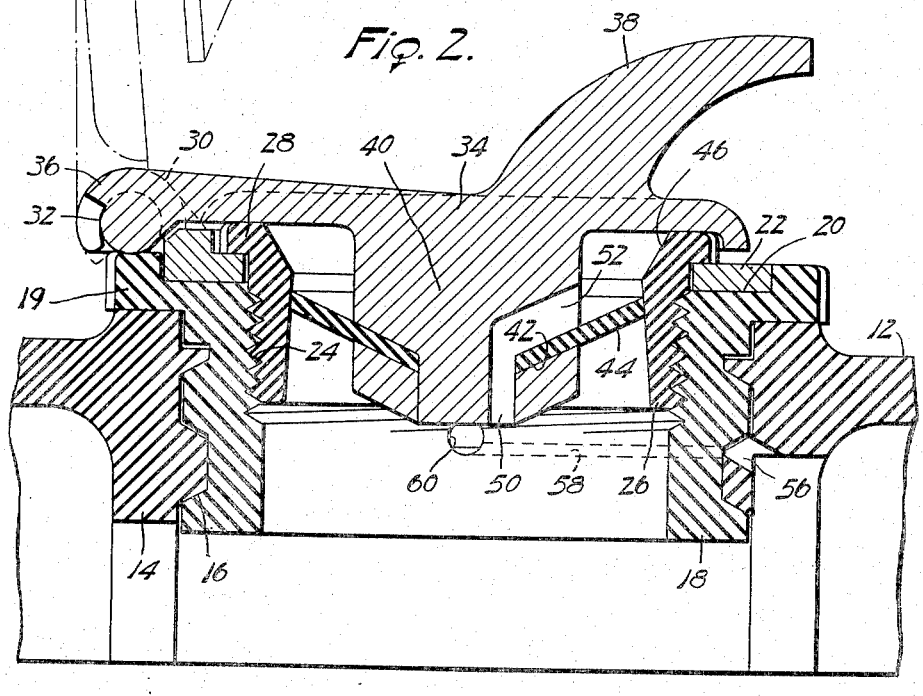

In the drawing:

Fig. 1 is a fragmentary top elevation of a storage battery cell, illustrating a vent cap device of the invention in closed position thereon; and Fig. 2 is a fragmentary section, on an enlarged scale, taken along line II—II of Fig. 1; showing in solid lines the cap device in closed position and in broken lines the cap in open or servicing position.

In the drawing the invention is illustrated in connection with a storage battery cell designated generally 10; the cell 10 having a top cover plate portion 12 which is formed with a conventional style opening comprising a tubular well portion 14 (Fig. 2) part of which is internally threaded as indicated at 16 in order to accommodate the conventional screw-threading type cap such as is normally used for battery opening cover purposes. The cap device of the present invention includes an externally threaded adapter 18 which is designed to be screw-threaded into the well 14 and is formed with an annular top shoulder 19 which seats upon the top surface of the vent well 14. The adapter 18 is formed with an annular seat portion 20 which is adapted to receive a cap mounting ring 22 in flat seated relation thereon. The adapter 18 is internally threaded as indicated at 24 to accommodate a locking sleeve 26 in screw-threaded relation therein; the sleeve 26 having an annular overhanging shoulder portion 28 which is adapted to clamp down upon the ring 22 so as to hold the latter in tightly clamped relation upon the adapter 18 when the parts are relatively assembled. This arrangement permits the hinge ring 22 to be assembled at any desired angle relative to the battery case to suit different installations.

The ring 22 is formed with hinge bearing portions 30—30 integrally therewith which receive the pintle 32 of the cap hinge structure. The cap portion is designated generally at 34 to comprise a molded circular body adapted to cover the top end of the sleeve 26. The cover 34 is formed with an eye portion 36 which mounts the pintle 32, thereby pivotally connecting the cap 34 to the mounting ring 22. Preferably, the cap 34 is provided with a projecting handle 38 to facilitate opening of the cap such as by placing the end of a battery filling pipe or other suitable tool under the outer end of the handle 38 and then prying upwardly thereon so as to swing the cap upwardly and rearwardly as to the broken line position thereof shown in Fig. 2.

The cap member 34 is formed at its inner central surface with an inwardly protruding boss 40 which is of substantially less diameter than the bore of the sleeve 26; the boss 40 being annularly grooved as indicated at 42 to receive the inner edge of a conically shaped flexible gasket 44 which is constructed of some suitable pliable acid resistant material, such as for example a soft rubber or synthetic resin fabrication, or the like. The gasket 44 is dimensioned to bridge the gap between the boss 40 and the sleeve 26 so that when the cap is in its closed position (as illustrated by the solid line showing in Fig. 2) the battery electrolyte will be prevented by the gasket 44 from spraying or splashing out of the cell, such as when the vehicle carrying the battery is jolted. To facilitate operation of the gasket 44, the upper end portion of the sleeve 26 is bevelled as indicated at 46 (Fig. 2), whereby whenever the cap moves toward its closed position the gasket 44 easily wipes downwardly into the funnelled bore of the sleeve and then assumes the electrolyte sealing position as illustrated in the drawing. It is a particular feature of this invention that the sleeve 26 is taper-bored so that the juncture of the main bore and the bevel bore 46 provides an inwardly extending shoulder against which the gasket 44 moves under increasing compression whenever the cap tends to move upwardly away from full closed position. This action provides an automatic "latching" of the cap against accidental opening and/or chattering of the cap such as would permit sloppage of the battery acid and/or entrance of debris into the cell, such as during external cleansing operations.

To permit the gases which are generated during operation of the battery to escape from the cell, the boss portion 40 of the cap member is provided with a passageway 50 which extends up through the boss portion past the gasket 44 and thence out through a sidewall passageway 52, so as to deliver the gas through a devious path into the chamber formed above the gasket 44 and between the sleeve 26 and the boss portion 40. The meeting surfaces of the collar 26 and the cap 34 are not fabricated so as to accurately interfit, but are preferably left in the molded form thereof whereby the irregularities of the molded surfaces permit the battery gas to escape therebetween. However, in case the gas within the battery develops so as to build up any appreciable pressure within the cell, such pressure will simply cause the cap 34 to lift slightly relative to its seat against the top surface of the collar 26, thereby permitting the gas to escape.

In event the level of the electrolyte is above the bottom of the adapter 18, the gas accumulating in the uppermost portion of the cell is permitted to escape through an opening drilled as indicated at 56 (Fig. 2) which enables the gas to gain access to an annular groove 58 leading around the adapter 18 into communication with a port 60 through the adapter wall. Thus, the gas may travel from the upper portion of the cell through the opening 56 and the groove 58, and thence through the port 60 into the interior of the adapter 18 whereupon it can escape through the passageways 50—52, as explained hereinabove. The relative arrangement of the boss and gasket portions and the cap top portion provide a series of baffling devices which during battery operation are usually at a lower temperature than the electrolyte, and thus any ascending spray from the cell is condensed and baffled so that nothing but dry gas is vented. Any acid condensing in the chamber above the gasket 44 simply runs back down into the cell.

It is a particular feature of the present invention that the cap member 34 and the hinge mechanism thereof is constructed and arranged so as to provide that whenever the cap is lifted and swung over to its open position as illustrated by the broken lines in Fig. 2, the forces of gravity acting thereon will tend to maintain the cover in such open position. However, when in this position the center of gravity of the cap structure is only slightly offset from the vertical plane of the hinge axis, so that in event the battery attendant overlooks closing the cap subsequent to a servicing operation on the battery, the slightest joggling of the battery such as would occur upon movement of the vehicle in which the battery is mounted will cause the cap to fall back into its closed position.

As explained hereinabove the gasket 44 wipes smoothly into the bore of the sleeve 26 and thereupon operates to prevent splashing of the battery liquid out of the opening, while the gas escape passageways are kept open at all times to permit the battery gas to escape as required. Thus, if the operator is careless and leaves the cap in open condition at the end of a servicing operation, the cap will automatically take care of itself and close for example immediately upon starting of the vehicle carrying the battery. As shown in the drawing, the adapter 18 and the sleeve 26 may be formed of hard rubber or plastic, while the ring 22 and the cap 34 may be formed of metal; but it is to be understood that the various parts may be formed of any preferred material or materials except that the cap 34 and the boss 40 should have sufficient weight to operate by gravity as set forth hereinabove.

It will be understood that it is another particular feature and advantage of the invention that the hinged cap device is readily adapted to be installed in presently conventional battery constructions while requiring no reconstruction of the battery cell covers; the adapter portion 18 being simply screwed into the conventional battery filler opening whereupon the cap hinge ring 22 is locked upon the upper end of the adapter 18 by means of the sleeve 26. It will be understood that which only one form of the invention has been shown and described in detail it is apparent to those skilled in the art that the invention is not so limited but that various changes may be made therein without departing from the spirit of the invention or the scope of the appended claims.

I claim:

1. A storage battery filler opening cap device for a storage battery including a casing having a threaded aperture therethrough, said cap device comprising a threaded adapter adapted to be inserted in screwthreaded relation within said casing aperture, a mounting ring adapted to set upon the upper end of said adapter, a locking sleeve adapted to fit upon said adapter in detachable connection therewith for locking said ring to said adapter, said ring having a hinge bearing device integral therewith, and a cap member having a hinge device in connection with said bearing device, said cap member comprising a top cover piece adapted to enclose the upper end of said sleeve and a reduced diameter central boss portion extending inwardly from said cover piece, and a conical pliable washer mounted upon said boss member to extend peripherally therefrom into slide bearing relation against the inner bore of said sleeve, said boss portion being formed with a deviously directed opening therethrough to conduct gas from the interior of said battery cell around said washer, said cap and hinge parts being so constructed and arranged as to permit said cap to be swung open to a substantially vertical standing position with the center of gravity of said cap slightly offset to the rear of the vertical plane of said hinge axis whereby said cap will normally tend to stand in open position but may be readily joggled so as to sway forward past its dead center position to thereupon fall into closed position relative to said battery filler opening.

2. A storage battery filler opening cap device for a storage battery including a casing having a threaded aperture therethrough, said cap device comprising an adapter adapted to be inserted in screwthreaded relation within said casing aperture, a mounting ring adapted to set upon the upper end of said adapter, a locking sleeve adapted to fit upon said adapter in detachable connection therewith for locking said ring to said adapter, said ring having a hinge bearing device integral therewith, and a cap member having a hinge device in connection with said bearing device, said cap member comprising a top cover piece adapted to enclose the upper end of said sleeve and a reduced diameter central boss portion extending inwardly from said cover piece, and a pliable washer mounted upon said boss member to extend peripherally therefrom into slide bearing relation against the inner bore of said sleeve, said cap and hinge parts being so constructed and arranged as to permit said cap to be swung open to a substantially vertical standing position with the center of gravity of said cap only slightly offset to the rear of the vertical plane of said hinge axis.

3. A storage battery filler opening cap device for a storage battery including a casing having a threaded aperture therethrough, said cap device comprising a threaded adapter adapted to be inserted in screwthreaded relation within said casing aperture, a mounting ring adapted to set upon the upper end of said adapter, a locking sleeve adapted to fit upon said adapter in detachable connection therewith for locking said ring to said adapter, said ring having a hinge bearing device integral therewith, and a cap member having a hinge device in connection with said bearing device, said cap member comprising a top cover piece adapted to enclose the upper end of said sleeve and a reduced diameter central boss portion extending inwardly from said cover piece, and a washer mounted upon said boss member to extend peripherally therefrom into slide bearing relation against the inner bore of said sleeve, said boss portion being formed with a deviously directed opening therethrough to conduct gas from the interior of said battery cell around said washer.

4. A storage battery filler opening cap device for closing the filler opening of a storage battery comprising a mounting device having an inner bore, said inner bore having a portion beveled upwardly and outwardly in the upper part thereof and a portion tapering downwardly and outwardly in the lower part thereof, the juncture of said bevel and said taper forming a portion of reduced diameter in said bore, a cover member hingedly connected to said mounting device and adapted to cover said inner bore when in closed position, a boss of reduced diameter extending downwardly from said cover member when the latter is in closed position, a pliable washer mounted upon said boss to extend peripherally therefrom into slide bearing relation against said inner bore, said washer being below said portion of reduced diameter when said cover member is in closed position.

5. A cap device for a storage battery filler opening comprising a mounting device having an inner bore and adapted to be inserted in said filler opening, an upper portion of said bore being beveled upwardly and outwardly and a lower portion of said bore being tapered downwardly and outwardly, the juncture of said bevel and said taper forming a portion of reduced diameter in said bore, a cover member hingedly connected to said mounting device and adapted to cover said inner bore when in closed position, a boss of reduced diameter extending downwardly from said cover member when the latter is in closed position, a pliable washer mounted upon said boss to extend peripherally therefrom into slide bearing relation against said bore, said washer being below said portion of reduced diameter when said cover member is in closed position, and means carried by said cap device providing a rest for said cover member when the latter is swung open to a substantially vertical standing position with the center of gravity of said cover member only slightly offset to the rear of the vertical plane of said hinge axis.

6. A storage battery filler opening closure device comprising a mounting device adapted to be detachably connected upon a storage battery casing and having an inner bore a portion of which is of restricted diameter, a hinge bearing device carried by said mounting device, a cap freely hinged to said bearing device and comprising a top cover piece adapted to cover the upper end of said inner bore and a central boss portion adapted to extend into said inner bore when said cap is in closed position, a pliable washer mounted on said boss portion to extend peripherally therefrom into wiping slide bearing relation against said inner bore so as to resist opening movement of the cap, and stop means limiting the openward movement of said cap to a position with its center of gravity slightly offset outwardly of the vertical plane through the hinge axis.

7. A storage battery filler opening closure comprising a mounting device having an inner bore, means defining a restricted portion of reduced diameter in said inner bore, a cap device hingedly mounted on said mounting device and comprising a top cover piece adapted to cover the upper end of said inner bore and a central boss portion adapted to extend into said inner bore, and a pliable washer carried by said boss portion to extend peripherally therefrom into wiping slide bearing relation with said inner bore, said washer being beyond said portion of reduced diameter when said cap device is in closed position.

8. A storage battery filler opening cap device for a storage battery including a casing having a threaded aperture therethrough, said cap device comprising a threaded adapter adapted to be inserted in screw threaded relation within said casing aperture, a mounting ring adapted to set upon the upper end of said adapter, a locking sleeve adapted to fit upon said adapter in detachable connection therewith for locking said mounting ring to said adapter, said ring having a hinge bearing device integral therewith, a cap member hinged to said hinge bearing device and comprising a cover piece adapted to enclose the upper end of said sleeve and a boss portion adapted to extend inwardly from said cover piece into the inner bore of said sleeve, and a pliable washer carried by said boss portion and extending peripherally therefrom into slide bearing relation against the inner bore of said sleeve when said cap member is moved to closed position.

9. A storage battery filler opening closure device comprising a mounting device adapted to be detachably fitted to a filler opening in a storage battery casing, means defining an inner bore in said mounting device, an inwardly extending shoulder of reduced diameter in said inner bore to provide a constriction therein, a cap device hinged to said mounting device, said cap device comprising a cover piece adapted to cover said inner bore and a boss portion on said cover piece adapted to extend into said inner bore, a pliable washer carried by said boss portion to extend peripherally therefrom into wiping slide bearing relation with said inner bore and past the constriction therein as said cap device is moved to closed position, whereby said washer and said shoulder cooperate to resist movement of said cap device to open position, and stop means limiting the openward movement of said cap device to a position with its center of gravity slightly beyond the vertical plane through the hinge axis.

HENRY A. KENNEDY.

References Cited in the file of this patent

UNITED STATES PATENTS

| Number | Name | Date |
| --- | --- | --- |
| 51,844 | Lyman | Jan. 2, 1866 |
| 493,701 | Gillette | Mar. 21, 1893 |
| 703,524 | Brewington | July 1, 1902 |
| 844,400 | Radbruch | Feb. 19, 1907 |
| 1,116,893 | Hutchison | Nov. 10, 1914 |
| 1,130,977 | Hutchison | Mar. 9, 1915 |
| 1,165,100 | Holland | Dec. 21, 1915 |
| 2,088,543 | Woodbridge | July 27, 1937 |
| 2,480,437 | Berg et al. | Aug. 30, 1949 |
| 2,506,952 | Doughty | May 9, 1950 |

FOREIGN PATENTS

| Number | Country | Date |
| --- | --- | --- |
| 62,981 | Sweden | Mar. 10, 1924 |
| 203,670 | Great Britain | Apr. 17, 1924 |
| 361,832 | Great Britain | Nov. 26, 1931 |
| 755,034 | France | Nov. 18, 1933 |